Oct. 5, 1965

K. KUPFERBERG ETAL 3,210,619

SOLID STATE RECTIFIER CONSTRUCTION

Filed June 6, 1961

INVENTOR.
KENNETH KUPFERBERG
AARON ROSENFELD
JEAN P. KELLER
BY Alfred W. Barber
ATTORNEY

United States Patent Office 3,210,619

Patented Oct. 5, 1965

3,210,619

SOLID STATE RECTIFIER CONSTRUCTION

Kenneth Kupferberg, Flushing, Aaron Rosenfeld, Jackson Heights, and Jean P. Keller, Elmhurst, N.Y., assignors to Forbro Design Inc., New York, N.Y., a corporation of New York Filed June 6, 1961, Ser. No. 115,134

3 Claims. (Cl. 317—234)

The present invention concerns heat sink and mounting method and means for power rectifiers in a bridge circuit.

Solid state rectifiers are widely used in electronic and other equipment for converting alternating current to direct current. Since the rectification process involved is not 100 percent efficient some heat is always generated. However, since all solid state rectifiers are limited in their tolerance of heat without damage, this heat must be dissipated. In addition, the more heat dissipated, the more the power which can be handled. Therefore it follows that it is very desirable to dissipate as much heat as possible for most solid state rectifier applications, at least those which have to do with power supplies of all kinds. It follows naturally that for a great many applications, the heat dissipating means should not only be effective but it should also be simple, fool-proof and inexpensive. One common method of construction widely used is to assemble annular rectifying elements interleaved with cooling flanges on a long mounting bolt. However, this type of rectifier and heat dissipator is inconvenient to use, has a poor shape factor for many applications and is subject to expensive failures where one element in going bad destroys the usefulness of the entire assembly.

It has been found according to the present invention that the problems of the prior type rectifier assemblies may be overcome and a number of advantages gained. These advantages are particularly apparent in the bridge rectifier circuit utilizing four rectifying diodes. Briefly the present invention consists in utilizing four similar diode rectifier buttons pressed in pairs into two flat heat sink panels in a preferred configuration. This configuration is a staggered arrangement whereby two plates may be assembled in closely spaced relationship and it has been found that this arrangement has the unexpected advantage of providing improved heat distribution patterns and is thus more effective and efficient than an in-line arrangement or one with central positioning of the rectifier element. An additional advantage from a manufacturing stand-point is that with this configuration only one part is required for the heat sink plates since both are the same.

Accordingly one object of the present invention is to provide methods of and means for supplying a simple, effective and inexpensive power rectifier heat sink and assembly.

Another object is to provide a rectifier arrangement in which two identical heat sink plates with two button rectifiers in each furnishes a full wave rectifier bridge.

Still another object is to provide a compact two plate full wave rectifier with high heat dissipating efficiency.

These and other objects will be apparent from the detailed description of the invention given in connection with the various figures of the drawing.

Figures 1, 2:
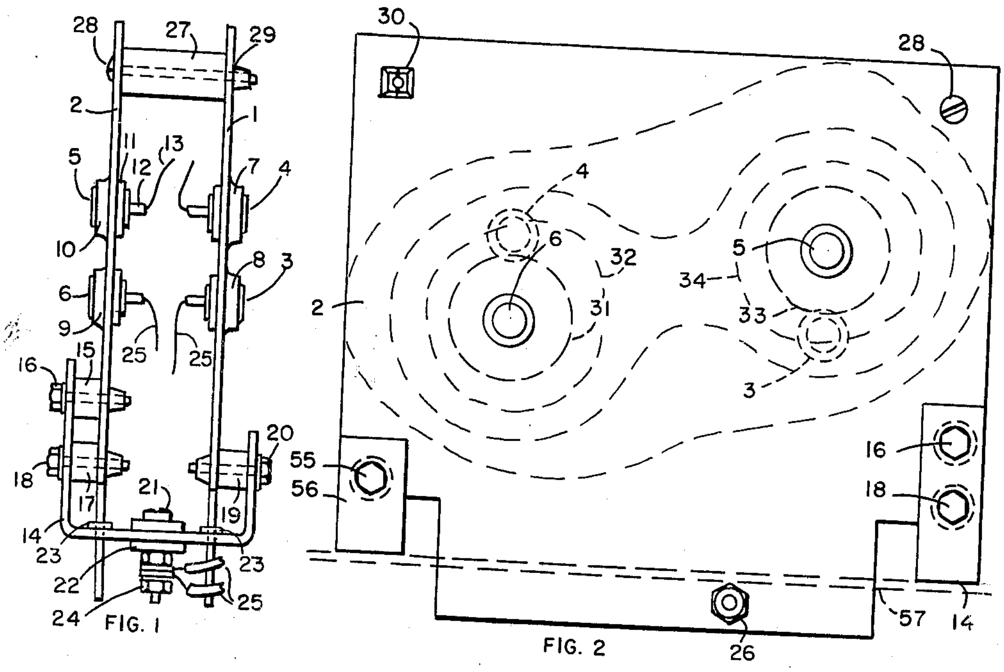
FIGURE 1 is an end view of the preferred form of the present invention.
FIGURE 2 is a side of the preferred form of the invention.

FIG. 1 is an end view of the preferred form of the present invention in which the two flat heat sink plates 1 and 2 are provided with extrusions 7, 8, 9 and 10 into which are pressed rectifier buttons 4, 3, 6 and 5 respectively. Each of these rectifiers includes shoulder 11, electrode pin 12 to which circuit lead 13 may be attached as shown for rectifier 5. The other rectifiers are similarly constructed. The two heat sink plates 1 and 2 are conveniently held by U bracket 14 which serves to hold mounting insulators 15, 17 and 19 secured by bolts 16, 18 and 20 respectively. The upper end of plates 1 and 2 are spaced by insulator 27 and a similar insulator on the far side. Belt 28 passes through insulator 27 and expands its end into square hole 29 (same as square hole 30 in FIG. 2). The U bracket 14 being insulated from the rectifier plates may be mounted directly on a chassis as by clinch nuts 23 and may also carry circuit terminal 21–24 insulated by washer 22. Leads 25 are connected to terminal 21–24. It will be seen from FIGS. 1, 2 and 5 that plates 1 and 2 may be identical.

FIG. 2 is a side view of the form of the invention shown in FIG. 1 in which similar parts are similarly numbered. Rectifiers 5 and 6 are located at approximately the centers of right and left halves of plate 2 and slightly above and below the horizontal center of the main body of plate 2 respectively. Rectifiers 3 and 4 are similarly mounted on plate 1. These mounting locations permit plates 1 and 2 to be identical; provide clearance between the rectifiers so that their heat sink plates may be mounted close together without shorting; and provide optimum heat dissipation as shown by the dotted equal temperature lines 31, 32, 33, 34, etc. shown as dash lines. If the rectifiers are mounted on the same horizontal line, the equal temperature lines become distorted toward the edges of the heat sink showing a less efficient heat dissipation. Fig. 2 also shows a typical chassis 57 upon which the assembly may be mounted by U brackets 14 and 56 by means of bolts 16, 18, and 55. The electrical connection 26 to plate 2 is also shown. The U brackets are also identical and by having two holes in one end and one in the other assist in identification during assembly and provide non-pivoting mounting of the plates 1 and 2.

Figure 3:
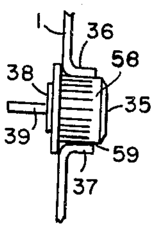
FIGURE 3 is a detail showing how the rectifiers are mounted in the heat sink plates.

FIG. 3 is a detail showing the chassis 1 cut open through the extrusion and showing how the sides of the extrusion 36 and 37 receive the rectifier button 35 pressed into the opening. The surface of the body of the rectifier 58 may be scored to bite into the sides 36 and 37 so that extremely good thermal contact as at 59 is provided. The second electrode 39 of the rectifier is mounted in the insulator 38. Thus, the complete rectifier utilizes the inexpensive button rectifier and is assembled by pressing, a production type operation, into the extruded holes in the heat sink, a non-critical operation. The result is a complete rectifier using a minimum of parts, inexpensive parts and assembled by non-critical production type operations.

Figure 4:
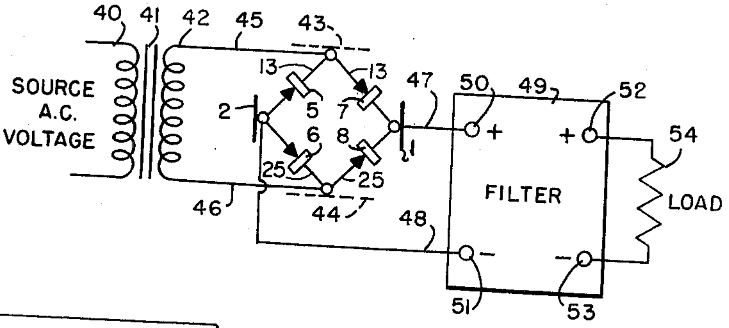
FIGURE 4 is a schematic circuit showing how the present invention is used.

FIG. 4 is a schematic circuit showing a typical use of the rectifier assembly. This circuit is that of a basic power supply in which alternating current transformer 40–41–42 is provided with primary 40 to be connected to a source of alternating current and secondary 42 connected over leads 45 and 46 to the diagonals of the bridge rectifier composed of rectifiers 5, 6, 7 and 8. The other diagonals of the bridge which are at the same time the heat sink plates 1 and 2, are connected over leads 47 and 48 to input terminals 50 and 51 of a suitable filter 49. The filter output terminals 52 and 53 serve as connections to a load 54 to be supplied with direct current. With plates 1 and 2 as shown, similar electrodes of the rectifiers are in contact with a given heat sink, i.e. anodes to plate 1 and cathodes to plate 2. An alternate assembly may be made as indicated by dotted heat sink representations 43 and 44 in which each plate is in contact with an anode and a cathode. This is possible since the button rectifiers are assembled with either anode to case or cathode to case.

Figure 5:
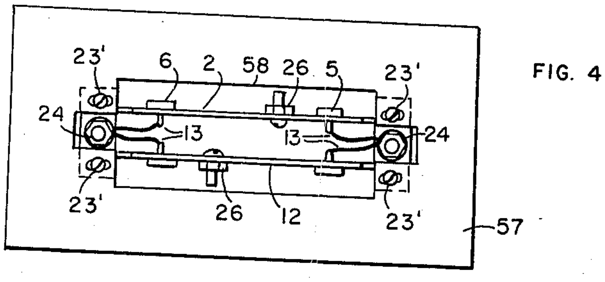
FIGURE 5 is a bottom view of the preferred form of the invention.

FIG. 5 is a bottom view of the rectifier assembly mounted on a mounting plate or chassis 57 which is cutout in the shape shown at 58. This particular cut-out shape allows the rectifier plates to pass through the chassis and thereby provide an air channel for improved cooling effect. Terminals 24 and 26 are available below the chassis for making circuit connections and suitable areas are provided for mounting screws 23'. Plate 57 may be taken to represent an auxiliary mounting plate or may be taken to represent a portion of a main chassis provided with the cut-out 58.

While only one embodiment of the present invention has been shown and described, modifications will be apparent to those skilled in the art and within the spirit and scope of the invention as set forth in particular in the appended claims.

What is claimed is:

1. A solid state bridge rectifier assembly including, in combination, a pair of planar heat sink plates disposed in parallel planes, each plate including an aperture in each of two diagonally disposed quadrants thereof, the line defined by the apertures in one of said plates being disposed in an angular relation to the line defined by the apertures in the other plate, a button-type metal-bodied rectifier in each of the apertures in each of said plates with stressed metal to metal contact between the metal bodies of said rectifiers and the wall of each aperture for maximizing heat transfer between the rectifiers and the plates and for minimizing heat distortion of the equal temperature lines in said plates due to heat conducted from said rectifiers to said plates.

2. A solid state rectifier as set forth in claim 1 wherein the two rectifiers carried by one of said plates are constructed with their anodes connected to the body of the rectifier in contact with the plate and the remaining two rectifiers are constructed with their cathodes connected to the body of the rectifier in contact with the plate.

3. A solid state rectifier as set forth in claim 1 wherein the two rectifiers carried by a given plate are constructed one with the body of the rectifier in contact with the plate connected to the rectifier anode and with the second rectifier body in contact with the plate connected to the rectifier cathode.

References Cited by the Examiner

UNITED STATES PATENTS

| | | | |
|---|---|---|---|
| 2,942,165 | 6/60 | Jackson et al. | 317—234 |
| 2,980,828 | 4/61 | Eggers | 317—234 |
| 3,054,032 | 9/62 | Sabins | 317—234 |
| 3,132,288 | 5/64 | Talentinow et al. | 317—100 |

FOREIGN PATENTS

| | | |
|---|---|---|
| 841,139 | 7/60 | Great Britain. |

JOHN W. HUCKERT, *Primary Examiner.*

JAMES D. KALLAM, DAVID J. GALVIN, *Examiners.*